(12) United States Patent
Peng et al.

(10) Patent No.: US 11,737,566 B2
(45) Date of Patent: Aug. 29, 2023

(54) CONNECTION STRUCTURE FOR COMPOSITE BACKREST AND A METHOD FOR MAKING THE SAME

(71) Applicant: SHANGHAI CEDAR COMPOSITES TECHNOLOGY CO., LTD., Shanghai (CN)

(72) Inventors: Yi Peng, Shanghai (CN); Jianlan Luo, Shanghai (CN); Jiaqiang Zhu, Shanghai (CN); Nannan Yu, Shanghai (CN); Hao Zhang, Shanghai (CN)

(73) Assignee: SHANGHAI CEDAR COMPOSITES TECHNOLOGY CO., LTD., Shanghai (CN)

( * ) Notice: Subject to any disclaimer, the term of this patent is extended or adjusted under 35 U.S.C. 154(b) by 269 days.

(21) Appl. No.: 17/279,310

(22) PCT Filed: Jan. 14, 2021

(86) PCT No.: PCT/CN2021/071643
§ 371 (c)(1),
(2) Date: Mar. 24, 2021

(87) PCT Pub. No.: WO2022/110515
PCT Pub. Date: Jun. 2, 2022

(65) Prior Publication Data
US 2022/0400867 A1 Dec. 22, 2022

(30) Foreign Application Priority Data
Nov. 30, 2020 (CN) .......................... 202011376175.4

(51) Int. Cl.
*B60N 2/68* (2006.01)
*A47C 7/40* (2006.01)
*A47C 7/02* (2006.01)

(52) U.S. Cl.
CPC .................. *A47C 7/40* (2013.01); *A47C 7/02* (2013.01); *B60N 2/68* (2013.01); *B60N 2/682* (2013.01);
(Continued)

(58) Field of Classification Search
CPC .... A47C 3/12; A47C 5/12; A47C 4/00; B60N 2/68; B60N 2/682; B60N 2002/684; B60N 2/686
(Continued)

(56) References Cited

U.S. PATENT DOCUMENTS 2,575,221 A * 11/1951 Hiltman ............... B60N 2/7029
297/440.16
4,890,888 A * 1/1990 Kostin .................... B60N 2/68
297/440.21
(Continued)

FOREIGN PATENT DOCUMENTS

CA 2956758 A1 * 9/2017 ............... A47C 5/12
CN 205220454 U 5/2016
(Continued)

*Primary Examiner* — Rodney B White
(74) *Attorney, Agent, or Firm* — Bayramoglu Law Offices LLC

(57) ABSTRACT

A connection structure for a composite backrest and a method for making the same are provided. The connection structure includes two frames, a backrest body, and metal bushings. The metal bushings include a group of left metal bushings and a group of right metal bushings. The two frames are respectively fixed to the left side and the right side of the backrest body by the left metal bushings and the right metal bushings. The method includes: punching the backrest body and the frames; placing the frames into the backrest body; processing the metal bushings; sandblasting or sanding the external surface of the metal bushing; coating a configured structural adhesive on the metal bushing, and oppositely bonding the metal bushing; fixing the bonded (Continued)

metal bushing by a tool; and placing the fixed metal bushing, the composite backrest and the two frames into a drying oven for heating.

13 Claims, 2 Drawing Sheets

(52) U.S. Cl.
CPC ........ B60N 2/686 (2013.01); *B60N 2002/684* (2013.01)

(58) Field of Classification Search
USPC ............ 297/440.16, 440.21, 452.14, 452.15, 297/452.18, 452.2
See application file for complete search history.

(56) References Cited

U.S. PATENT DOCUMENTS

| | | | | |
|---|---|---|---|---|
| 4,958,877 A * | 9/1990 | Lezotte | ................... | B60N 2/36 296/65.17 |
| 5,005,908 A * | 4/1991 | Young | ..................... | A47C 7/40 297/440.21 X |
| 5,184,871 A * | 2/1993 | LaPointe | ................ | A47C 7/42 297/440.21 X |
| 5,269,589 A * | 12/1993 | Brothers | ................. | A47C 7/42 297/440.16 |
| 5,411,316 A * | 5/1995 | Lovegrove | .............. | A47C 7/44 297/452.15 X |
| 5,711,577 A * | 1/1998 | Whalen | ................. | B60N 2/233 297/452.18 X |
| 5,795,024 A * | 8/1998 | Collins | ................... | B60N 2/23 297/452.18 X |
| 5,826,944 A * | 10/1998 | Beneker | ................ | B60N 2/682 297/452.18 |
| 6,322,148 B1 * | 11/2001 | Kolena | ................. | B60N 2/682 297/452.2 X |
| 6,543,855 B2 * | 4/2003 | Bruck | ..................... | A47C 7/40 297/440.16 |
| 6,685,272 B1 * | 2/2004 | Bonk | ....................... | B60N 2/23 297/452.18 |
| 7,306,290 B2 * | 12/2007 | Wiecek | .................... | A47C 7/42 297/440.16 |
| 7,399,036 B2 * | 7/2008 | Kowal | ..................... | A47C 4/02 297/440.16 |
| 7,959,232 B2 * | 6/2011 | Sawada | .................. | B60N 2/686 297/440.16 |
| 8,967,725 B2 * | 3/2015 | Nasshan | ............ | B60N 2/42709 297/452.18 |
| 2002/0079730 A1 * | 6/2002 | Schuhmacher | ........ | B60N 2/015 297/378.1 |
| 2005/0168041 A1 * | 8/2005 | Glance | ..................... | B60N 2/68 297/452.2 |
| 2007/0029861 A1 * | 2/2007 | Krauth | ............... | B64D 11/0619 297/452.18 |
| 2007/0145807 A1 * | 6/2007 | Gundall | ................ | B60N 2/062 297/452.18 |
| 2008/0129097 A1 * | 6/2008 | Kowal | .................. | B60N 2/682 297/284.4 |
| 2013/0015694 A1 * | 1/2013 | Tosco | ..................... | B60N 2/686 297/452.18 |
| 2014/0300171 A1 * | 10/2014 | Velasco | ................... | A47C 5/06 297/452.18 |
| 2015/0044402 A1 * | 2/2015 | Carson, Jr. | ............... | A47C 5/12 428/34.5 |
| 2017/0158104 A1 * | 6/2017 | Le | ............................ | B60N 2/70 |
| 2018/0043799 A1 * | 2/2018 | Ayyash | .................... | B60N 2/20 |

FOREIGN PATENT DOCUMENTS

| | | |
|---|---|---|
| CN | 107081945 A | 8/2017 |
| CN | 109955755 A | 7/2019 |
| CN | 209892614 U | 1/2020 |
| KR | 20160078586 A | 7/2016 |

* cited by examiner

CONNECTION STRUCTURE FOR COMPOSITE BACKREST AND A METHOD FOR MAKING THE SAME

CROSS REFERENCE TO THE RELATED APPLICATIONS

This application is the national phase entry of International Application No. PCT/CN2021/071643, filed on Jan. 14, 2021, which is based upon and claims priority to Chinese Patent Application No. 202011376175.4, filed on Nov. 30, 2020, the entire contents of which are incorporated herein by reference.

TECHNICAL FIELD

The present invention relates to a connection structure for a composite backrest and a method for making the same. The connection structure has reliable structural strength and improved performance of force transmission, while providing the strength required under conditions such as high impact and high torsion.

BACKGROUND

At present, composite materials are widely used in various fields of production and life by virtue of their high strength and rigidity, superior impact resistance and excellent structural designability, as well as the ability to facilitate the shaping of cambered structures. Composite materials not only retain the advantages of all constituent materials, but also exhibit, by means of synergy and correlation among these constituent materials, an improved overall performance that cannot be achieved by a single constituent material. Also, composite materials can be easily formed into various complex shapes. Hence, composite materials are widely used in various fields such as aerospace, medicine, automobiles, textiles, and machinery making. Composite backrests have been gradually introduced in the field of aviation by virtue of their advantages of light weight and high strength. Current composite backrests typically have a structure with a combination of frames and a back plate. The connection between the backrest and a support component is accomplished by connecting pins or shafts into holes at the lower end of the frame. Once the composite backrest is punched, the current connection method has the following shortcomings:

(1) Fibers at the hole positions may fracture, which affects the performance of force transmission.

(2) Stress concentration may arise at the hole positions and consequently causes interfacial damage.

(3) The processing accuracy of the holes cannot achieve the accuracy required by metal processing. In this case, the pins or shafts cannot satisfactorily fit within the holes. As a result, gaps are present between the pins or shafts and the holes, resulting in nonuniform contact surfaces under stress, which easily causes unilateral damage.

SUMMARY

In view of the above-mentioned problems, an objective of the present invention is to provide a connection structure for a composite backrest and a method for making the same. The connection structure has reliable structural strength and improved performance of force transmission, while providing the strength required under conditions such as high impact and high torsion.

To solve the above-mentioned technical problems, the present invention adopts the following technical solution. A connection structure for a composite backrest includes two frames, a backrest body, and metal bushings. The metal bushings include a group of left metal bushings and a group of right metal bushings. The two frames are respectively fixed to the left side and the right side of the backrest body by the group of left metal bushings and the group of right metal bushings.

In a specific embodiment, each group of metal bushings include a plurality of groups of connection bushings.

In a specific embodiment, each group of connection bushings include an externally-threaded bushing and an internally-threaded bushing matched with the externally-threaded bushing. A threaded hole is formed in each of the two frames and the backrest body. The externally-threaded bushings and the internally-threaded bushings are engaged to fix the two frames to the backrest body. The externally-threaded bushings and the internally-threaded bushings on the same side of the backrest body are alternately arranged.

In a specific embodiment, the frames are hollow and rectangular.

In a specific embodiment, the lower half of the backrest body is thinner than the upper half of the backrest body, and the lower half is formed as a U-shaped groove.

A method for making a connection structure for a composite backrest includes:

step 1: punching the composite backrest body and the two frames, and placing the two frames into the backrest body;

step 2: processing the metal bushing into an externally-threaded bushing and an internally-threaded bushing matched with the externally-threaded bushing;

step 3: sandblasting or sanding the external surface of the metal bushing processed in step 2;

step 4: coating a configured structural adhesive on the metal bushing with the surface processed in step 3, and oppositely bonding the metal bushing from the two sides of the hole in the frame of the backrest;

step 5: fixing the bonded metal bushing by a tool; and step 6: placing the fixed metal bushing, the composite backrest and the two frames into a drying oven for heating, and removing the tool after the structural adhesive is completely cured.

In a specific embodiment, the composite backrest body in step 1 is made from a carbon fiber reinforced polymer, an aramid fiber reinforced polymer, or a glass fiber reinforced polymer.

In a specific embodiment, the metal bushing in step 2 is made from aluminum, steel, or copper.

In a specific embodiment, the step of processing the external surface of the metal bushing in step 3 specifically includes the following steps:

cleaning the external surface of the metal bushing by using a cleaning agent, sandblasting or sanding the surface according to different materials for roughening, cleaning the roughened surface by using the cleaning agent again, and according to different structural adhesives, coating the cleaned surface of the metal bushing with a primer to improve the bonding effect when necessary.

In a specific embodiment, the structural adhesive in step 4 includes an epoxy structural adhesive, a polyurethane structural adhesive, or an acrylic structural adhesive.

In a specific embodiment, the heating process in step 6 is performed at 40° C.-100° C. for 10-240 minutes.

The connection structure for a composite backrest and the method for making the same provided by the present invention has the following advantages. The connection structure provides more reliable structural strength between the composite backrest and a support component thereof, and has improved performance of force transmission, while providing the strength required under conditions such as high impact and high torsion.

In the figures:
1, frame; 2, backrest body; 3, metal bushing; 4, threaded hole; 301, externally-threaded bushing; 302, internally-threaded bushing.

DETAILED DESCRIPTION OF THE EMBODIMENTS

The technical solutions of the present invention are expounded below based on the preferred embodiments described with reference to the drawings.

Figure 1:
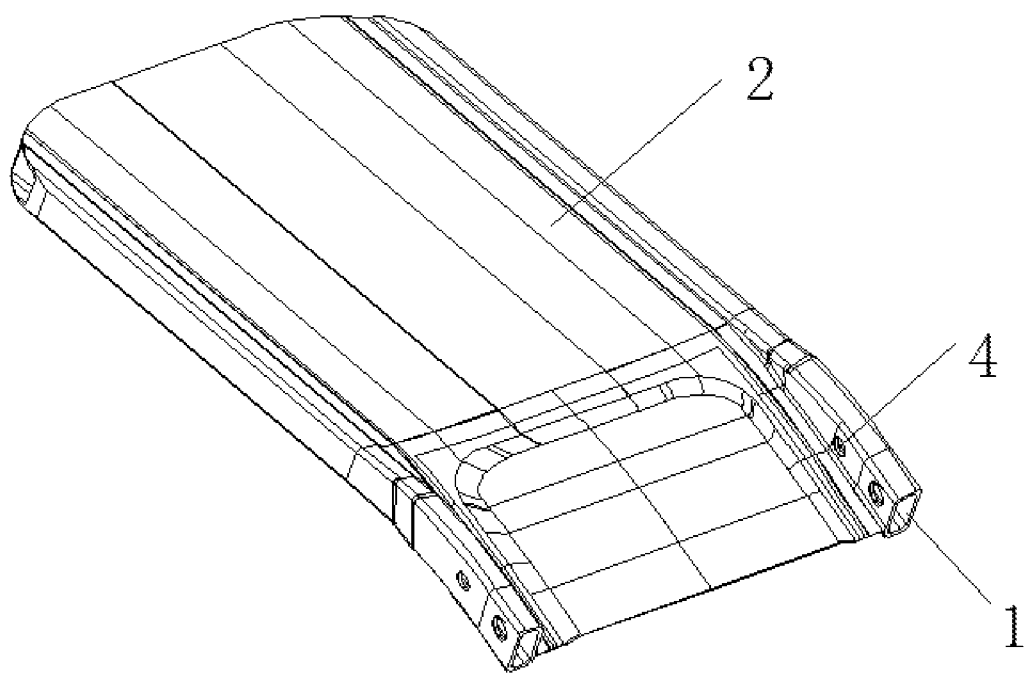
FIG. 1 is a schematic diagram of the composite backrest body and the frames after being punched according to the present invention.
Figure 2:
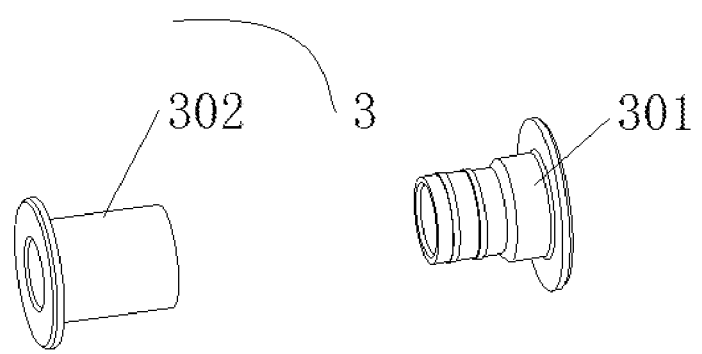
FIG. 2 is a structural schematic diagram of metal bushings according to the present invention.
Figure 2:
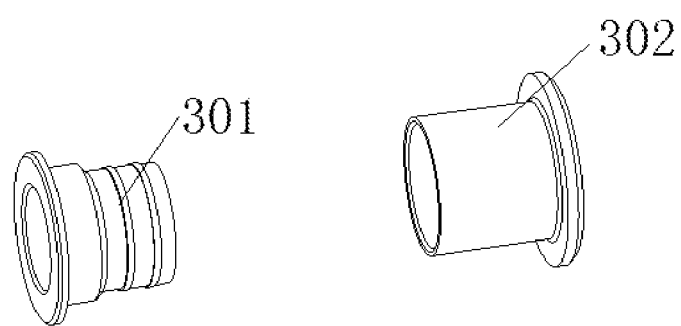
Figure 3:
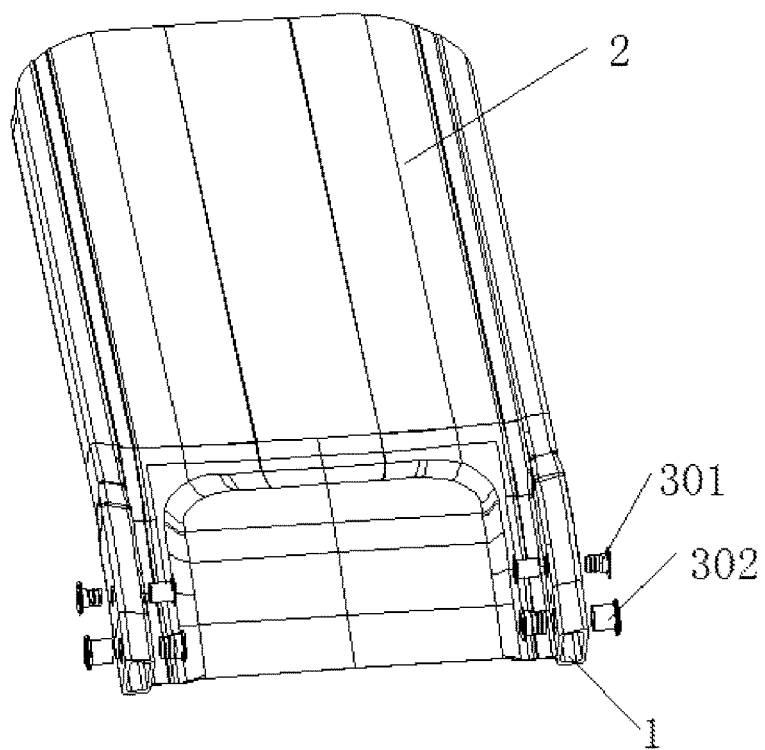
FIG. 3 is a schematic diagram illustrating opposite bonding of the metal bushings according to the present invention.
Figure 4:
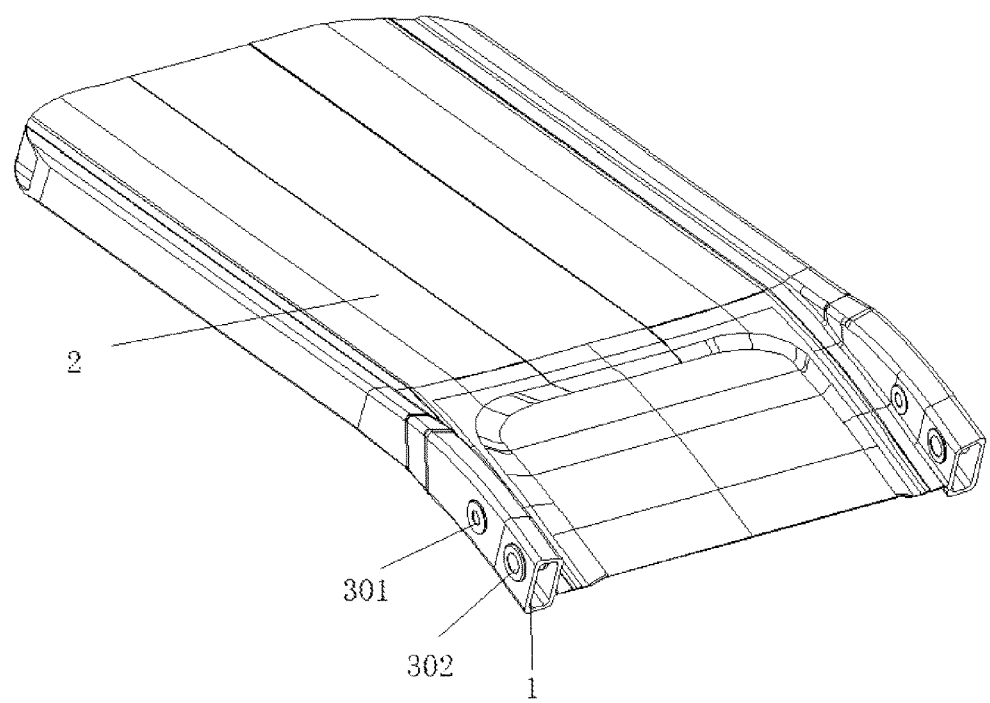
FIG. 4 is a schematic diagram of a connection structure for the composite backrest according to the present invention.

FIG. 1 is a schematic diagram of the composite backrest body and the frames after being punched according to the present invention. FIG. 2 is a structural schematic diagram of metal bushings according to the present invention. FIG. 3 is a schematic diagram illustrating the opposite bonding of the metal bushings according to the present invention. FIG. 4 is a schematic diagram of a connection structure for the composite backrest according to the present invention. As shown in these figures, the connection structure for a composite backrest includes the two frames 1, the backrest body 2, and the metal bushings 3. The metal bushings 3 include a group of left metal bushings and a group of right metal bushings. The two frames are respectively fixed to the left side and the right side of the backrest body by the group of left metal bushings and the group of right metal bushings. Each group of metal bushings include a plurality of groups of connection bushings.

Referring to FIGS. 3-4, each group of connection bushings include the externally-threaded bushing 301 and the internally-threaded bushing 302 matched with the externally-threaded bushing. The threaded hole 4 is formed in each of the two frames and the backrest body. The externally-threaded bushings and the internally-threaded bushings are engaged to fix the two frames to the backrest body. The externally-threaded bushings and the internally-threaded bushings on the same side of the backrest body are alternately arranged. Particularly, referring to FIG. 3, the externally-threaded bushings 301 and the internally-threaded bushings 302 in the group of left metal bushings are alternately arranged. In a group of upper connection bushings, the externally-threaded bushing 301 is located on the outer side of the backrest body 2, while the internally-threaded bushing 302 is located on the inner side of the backrest body 2. In a group of lower connection bushings, the externally-threaded bushing 301 is located on the inner side of the backrest body 2, while the internally-threaded bushing 302 is located on the outer side of the backrest body 2. If multiple groups of connection bushings are arranged, in the next group of connection bushings, the externally-threaded bushing 301 is located on the outer side of the backrest body 2, while the internally-threaded bushing 302 is located on the inner side of the backrest body 2. In still the next group of connection bushings, the externally-threaded bushing 301 is located on the inner side of the backrest body 2, while the internally-threaded bushing 302 is located on the outer side of the backrest body 2. Similarly, the externally-threaded bushings 301 and the internally-threaded bushings 302 in the group of right metal bushings are arranged in the same way.

In a specific implementation of the present invention, the frames are hollow and rectangular. The lower half of the backrest body is thinner than the upper half of the backrest body, and the lower half may be structurally formed as a U-shaped groove shown in the figure.

According to the present invention, a method for making the connection structure for a composite backrest includes:

Step 1: the composite backrest body and the two frames are punched, and the two frames are placed into the backrest body.

Step 2: the metal bushing is processed into the externally-threaded bushing and the internally-threaded bushing matched with the externally-threaded bushing.

Step 3: the external surface of the metal bushing processed in step 2 is sandblasted or sanded.

Step 4: a configured structural adhesive is coated on the metal bushing with the surface processed in step 3, and the metal bushing is oppositely bonded from the two sides of the hole in the frame of the backrest.

Step 5: the bonded metal bushing is fixed by a tool.

Step 6: the fixed metal bushing, the composite backrest and the two frames are placed into a drying oven for heating, and the tool is removed after the structural adhesive is completely cured.

The composite backrest body in step 1 is made from a carbon fiber reinforced polymer, an aramid fiber reinforced polymer, or a glass fiber reinforced polymer.

The metal bushing in step 2 is made from aluminum, steel, or copper.

The step of processing the external surface of the metal bushing in step 3 includes the following steps:

the external surface of the metal bushing is cleaned by using a cleaning agent, and is then sandblasted or sanded according to different materials for roughening; the roughened surface is cleaned by using the cleaning agent again; and according to different structural adhesives, the cleaned surface of the metal bushing is coated with a primer to improve the bonding effect when necessary.

The structural adhesive in step 4 includes an epoxy structural adhesive, a polyurethane structural adhesive, or an acrylic structural adhesive.

The heating process in step 6 is performed at 40° C.-100° C. for 10-240 minutes.

The connection structure obtained according to the process of the present invention provides the overall strength required under conditions such as high impact and high torsion, has stable performance, and effectively exploits the structural advantages of the composite backrest.

The connection structure for a composite backrest of the present invention is particularly used between the composite backrest and a support component thereof. Such a connection structure provides more reliable structural strength between the composite backrest and the support component thereof, and has improved performance of force transmission while providing the strength required under conditions such as high impact and high torsion. The connection structure obtained by means of the process according to the present invention has stable performance and effectively exploits the structural advantages of the composite backrest, and is thus conducive to be widely popularized and applied on the market.

The above describes the basic principles, main features and advantages of the present invention. Those skilled in the art should know that the present invention is not limited by the above embodiments. The above embodiments and the specification merely describe the principle of the present invention. The present invention further has various changes and improvements without departing from the spirit and principle of the present invention, and these changes and improvements shall fall within the scope of protection of the present invention. The scope of protection of the present invention is limited by the appended claims and their equivalents.

What is claimed is:

1. A connection structure for a composite backrest, comprising
   two frames, a composite backrest body, and metal bushings;
   wherein
   the metal bushings comprise a group of left metal bushings and a group of right metal bushings;
   the two frames are respectively fixed to a left side and a right side of the composite backrest body by the group of left metal bushings and the group of right metal bushings; and
   a lower half of the composite backrest body is thinner than an upper half of the composite backrest body, and the lower half is formed as a U-shaped groove.

2. The connection structure according to claim 1, wherein the group of left metal bushings and the group of right metal bushings each comprise a plurality of groups of connection bushings.

3. The connection structure according to claim 2, wherein the plurality of groups of connection bushings comprise externally-threaded bushings and internally-threaded bushings matched with the externally-threaded bushings;
   a threaded hole is formed in each of the two frames and the composite backrest body;
   the externally-threaded bushings and the internally-threaded bushings are engaged to fix the two frames to the composite backrest body; and
   the externally-threaded bushings and the internally-threaded bushings on the same side of the composite backrest body are alternately arranged.

4. The connection structure according to claim 1, wherein the two frames are hollow and rectangular.

5. A method for making a connection structure for a composite backrest comprising two frames, a composite backrest body, and metal bushings;
   wherein the metal bushings comprise a group of left metal bushings and a group of right metal bushings; and the two frames are respectively fixed to a left side and a right side of the composite backrest body by the group of left metal bushings and the group of right metal bushings,
   wherein the method comprises:
   step 1: punching the composite backrest body and the two frames, and placing the two frames into the composite backrest body;
   step 2: processing the metal bushings into externally-threaded bushings and internally-threaded bushings matched with the externally-threaded bushings;
   step 3: sandblasting or sanding an external surface of each metal bushing of the metal bushings processed in step 2;
   step 4: coating a configured structural adhesive on the each metal bushing with the external surface processed in step 3, and oppositely bonding the metal bushings from two sides of a threaded hole in each of the two frames of the composite backrest body;
   step 5: fixing the metal bushings by a tool; and
   step 6: placing the metal bushings, the composite backrest and the two frames into a drying oven for a heating process, and removing the tool after the configured structural adhesive is completely cured.

6. The method according to claim 5, wherein the composite backrest body in step 1 is made from a carbon fiber reinforced polymer, an aramid fiber reinforced polymer, or a glass fiber reinforced polymer;
   and each of the metal bushings in step 2 is made from aluminum, steel, or copper.

7. The method according to claim 5, wherein the step of sandblasting or sanding the external surface of the each metal bushing in step 3 specifically comprises the following steps:
   cleaning the external surface of the each metal bushing by using a cleaning agent, and sandblasting or sanding the external surface according to different materials for roughening to obtain a roughened external surface;
   cleaning the roughened external surface by using the cleaning agent again to obtain a cleaned external surface; and
   according to different structural adhesives, coating the cleaned external surface of the each metal bushing with a primer to improve a bonding effect according to a requirement.

8. The method according to claim 5, wherein the configured structural adhesive in step 4 comprises an epoxy structural adhesive, a polyurethane structural adhesive, or an acrylic structural adhesive.

9. The method according to claim 5, wherein the heating process in step 6 is performed at 40° C.-100° C. for 10-240 minutes.

10. The method according to claim 5, wherein the group of left metal bushings and the group of right metal bushings both comprises a plurality of groups of connection bushings.

11. The method according to claim 10, wherein the plurality of groups of connection bushings comprise the externally-threaded bushings and the internally-threaded bushings matched with the externally-threaded bushings;
    the threaded hole is formed in each of the two frames and the composite backrest body;
    the externally-threaded bushings and the internally-threaded bushings are engaged to fix the two frames to the composite backrest body; and
    the externally-threaded bushings and the internally-threaded bushings on the same side of the composite backrest body are alternately arranged.

12. The method according to claim 5, wherein the two frames are hollow and rectangular.

13. The method according to claim 5, wherein a lower half of the composite backrest body is thinner than an upper half of the composite backrest body, and the lower half is formed as a U-shaped groove.

* * * * *